Aug. 29, 1967   M. P. RAUPP   3,338,240
DEVICE FOR ALERTING OPERATORS OF MOTOR VEHICLES
Filed Aug. 3, 1964
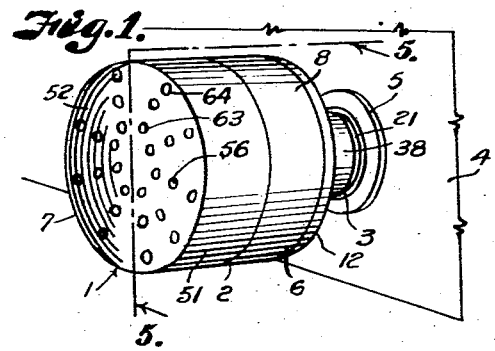
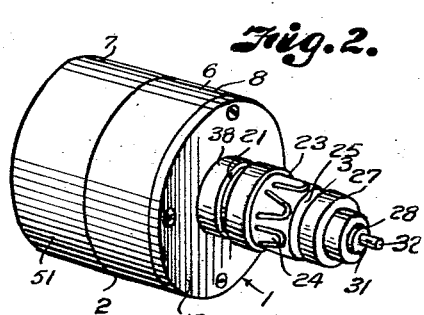
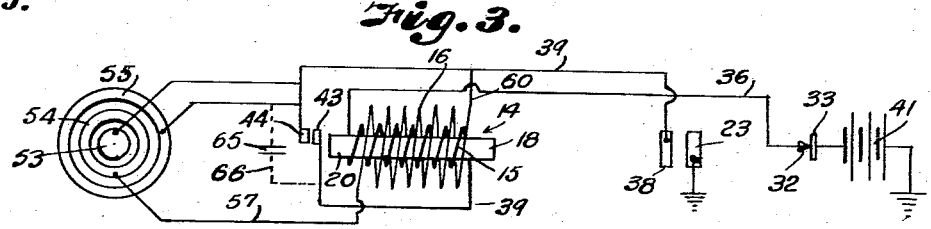
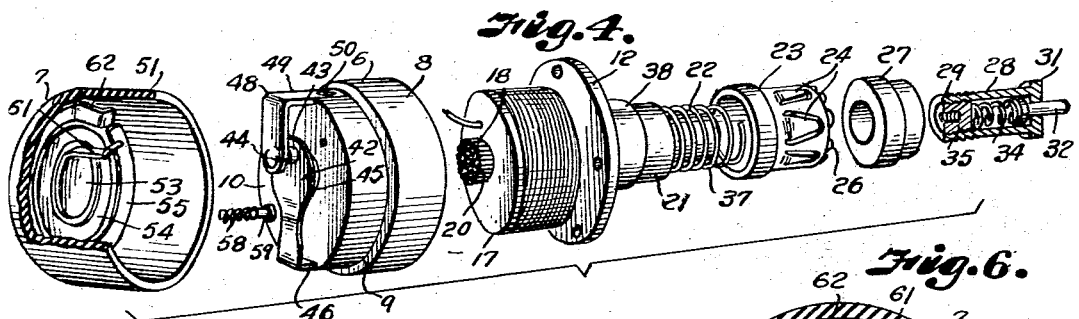
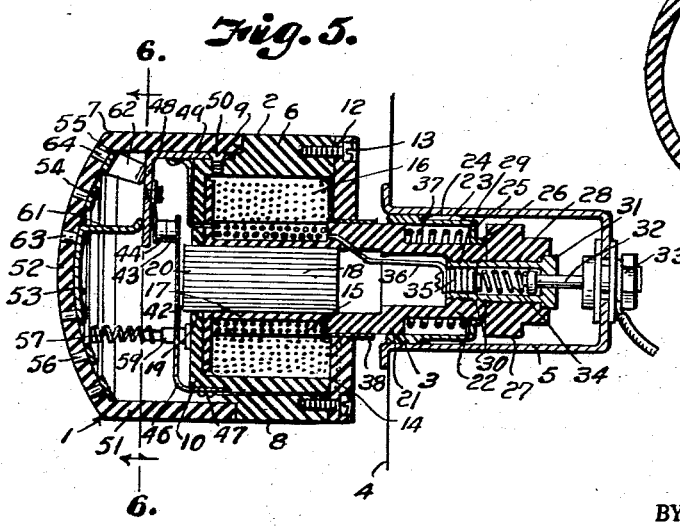
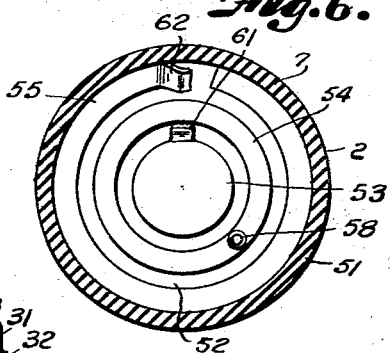
INVENTOR.
Max P. Raupp.
BY
Paul E. Mullendore
ATTORNEY.

United States Patent Office 3,338,240
Patented Aug. 29, 1967

3,338,240
DEVICE FOR ALERTING OPERATORS
OF MOTOR VEHICLES
Max P. Raupp, 7407 E. 109th St. Terrace,
Kansas City, Mo. 64134
Filed Aug. 3, 1964, Ser. No. 387,117
5 Claims. (Cl. 128—424)

This invention relates to an electrical device for stimulating alertness of operators of motor cars, trucks, busses, and similar vehicles in which safe operation is dependent upon the alertness of the operator.

For example, in the operation of motor vehicles rhythmic sounds, monotony, and long periods between stops, produce fatigue to an extent that the driver becomes drowsy and might fall asleep, perhaps only momentarily, but sufficient to cause serious accidents. It has, therefore, become the practice for many drivers to take stimulants to keep themselves awake, but many stimulants are habit forming and are not conducive to the good health and wellbeing of the operator. In fact, stimulants in the form of drugs are so hazardous that they have been outlawed for such use.

With the above in mind, the present invention contemplates a simple and inexpensive electrical device that may be plugged into the electrical system of a motor vehicle, which for convenience may be the socket of the cigar lighter, so that when the operator feels himself getting drowsy or becoming unalert to his responsibilities, he may touch the device with his hand, whereupon a gentle stimulating current passes through his body to restore alertness.

In carrying out the invention, the device illustrated includes a knob having a plug provided with contacts for, respectively, engaging the ground and live contacts of a cigar lighter or other socket forming a part of the electrical circuit of a vehicle. The knob carries an induction coil for supplying a high tension current and which is activated responsive to pressure of the hand on the knob, as illustrated in the accompanying drawings, wherein:

FIG. 1 is a perspective view of a device constructed in accordance with the present invention and showing mounting thereof in the socket of a cigar lighter on an instrument panel of a vehicle.

FIG. 2 is a perspective view of the device removed from the socket and viewed from the plug end thereof.

FIG. 3 is a diagrammatic view of parts of the device and showing the circuitry.

FIG. 4 is a perspective view of the parts of the device, shown in disassembled, spaced relation, portions of certain of the parts being shown in section to better illustrate the construction.

FIG. 5 is an enlarged, longitudinal section through the assembled device mounted in the socket of a cigar lighter, also shown in section, the section being taken on the line 5—5 of FIG. 1.

FIG. 6 is a cross section through the knob portion of the device and taken on the line 6—6 of FIG. 5.

Referring more in detail to the drawings:

1 designates an electrical device constructed in accordance with the present invention, and which includes a knob 2 having a plug portion 3 projecting from the rear thereof for mounting the knob in projection from an instrument panel 4 of a motor vehicle, the plug portion 3 being mounted in a socket 5, which may be the socket of a cigar lighter from which the cigar lighter (not shown) has been removed and replaced by the device 1, as illustrated in FIG. 1 of the drawing.

The knob 2 includes a body and cap members 6 and 7 formed of insulating material. The body member 6 is in the form of a cylindrical housing having an annular wall 8 that is provided with an annular shoulder 9 on its forward end for securing the cap 7 thereon. The cap end of the wall 8 is closed by an integral head 10, and the opposite end is closed by a removable ring 12 that is secured to the wall 8 by fastening devices, such as screws 13.

Mounted within the body member 6 is an induction coil 14, including a primary winding 15 and a secondary winding 16. The primary and secondary windings are wound upon a spool 17 which in turn sleeves an axial core 18, which may consist of a plurality of soft iron wires having ends projecting through an opening 19 in the center of the head 10 to provide a pole face 20. The spool 17 is carried on a hub 21 constituting a part of the plug portion 3. The hub 21 extends through the axial opening of the ring 12 and has a reduced extension 22.

Fixed on the hub 21 is a ground contact sleeve 23 having a diameter to fit snugly within the inner face of the socket 5. The sleeve 23 has a plurality of resilient tongues 24 that are struck therefrom, to frictionally engage the inner wall of the socket and hold the contact sleeve from movement during manipulation of the knob, as later described. Formed on the inner end of the ground contact sleeve 23 and bearing on the reduced extension 22 of the hub 21 is an inturned flange 25 provided with lips 26 to engage a stop collar 27 that is secured to the hub extension 22 by an electrically conductive sleeve 28. The sleeve 28 is provided with external threads 29 that are tightened in an internally threaded opening 30 of the reduced extension 22 of the hub, to cooperate with a head 31 on its opposite end for retaining the stop 27 therebetween. Slidably mounted coaxially within the sleeve 28 is a contact pin 32 that is resiliently urged into engagement with an electrical contact 33 of the socket 5 by means of a coil spring 34. The spring 34 is retained in the sleeve by a plug 35 that closes the outer end of the sleeve and which forms a connection for a conductor 36 connected with the primary winding 15. The contact 33 is electrically insulated from the socket so that the socket may serve as a ground connection.

Mounted on the reduced extension of the hub and housed within the sleeve 23 is a coil spring 37, to resiliently retain the knob in limited axial sliding movement within the ground contact sleeve 23 to make contact therewith of a contact ring 38 which is fixed to the hub 21. The contact ring 38 is connected with the other end of the primary winding 15 by a conductor 39, as shown in the wiring diagram, FIG. 3.

The primary and secondary windings 15 and 16 actually provide a transformer for converting low voltage current serving the socket 5 to a higher voltage circuit for supplying the stimulating current. For example, when an axial thrust is applied to the knob 2, the hub 21 thereof is shoved forwardly within the contact sleeve 23, to bring the contact ring 38 into engagement with the end of the contact sleeve 23. A current then passes from the contact 33 within the socket to the pin 32, spring 34, conductor 36 and through the primary winding to the conductor 39 to the ground contact sleeve 38 and grounded side of a source of the electric current, for example, the vehicle battery 41. The current flow establishes a flow through the core 18 within the primary winding or coil 15, which cuts the turns of the secondary winding 16, and the core 18 becomes an electromagnet for attracting an armature 42 of a vibratory switch including contacts 43 and 44.

In the illustrated instance, the armature comprises a thin metal disk 45 positioned over the pole face 20 of the core 18 and held in position by an arm 46 that secured to the shoulder portion of the body member by a fastening device 47. The contact 43 is fixed on the plate or disk 45 and normally engages the contact 44 which is carried on an angle-shaped bracket 48 having an arm 49 thereof secured to the opposite diametrical side of the shoulder portion of the body member by a fastening device 50. The contacts 43 and 44 are connected into the conductor 39 as shown in FIG. 3, to normally close the circuit through the primary winding, but when flux is established in the core 18 the armature 42 is drawn to the pole face 20 of the core 18 to break the circuit through the primary coil 15, whereupon the spring action in the disk 45 restores engagement of the contacts 43 and 44. Thus a pulsating secondary current is established in the secondary winding 16 to supply a relatively moderate high tension current to electrodes on the cap 7 of the knob, as now to be described.

The cap 7 has an annular portion 51 fitting tightly over the shoulder 9 of the body member 6 of the knob 2, and which carries on the outer end thereof a preferably dome-shaped head 52, which, in turn, carries upon the inner face thereof an electrode disk 53. Encircling the disk 53 and spaced therefrom is an electrode ring 54, and encircling the ring 54 in spaced relation therewith is an electrode ring 55. The intermediate ring 54 has connected thereto pins 56 that extend through the head of the cap, to provide exposed terminals on the outer face thereof. The ring 54 is connected with the secondary winding through a conductor 57 which includes a spring 58 carried on a fixed pin 59 and which bears against the inner face of the intermediate ring 54, as shown in FIG. 5. The opposite end of the secondary winding is connected with the ground conductor 39 by a conductor 60. The disk 53 and the outermost ring 55 have resilient arms 61 and 62 pressing upon the bracket 48, as shown in FIG. 5, so that the electrode disk 53 and electrode ring 55 are connected with the ground and with the grounded side of the secondary winding 16. The disk 53 and outer ring 55 have pins 63 and 64, respectively, for cooperating with the pins 56 in completing the secondary circuit when a hand is placed on the knob 2.

In using the device, the lighter (not shown) is removed from the socket 5, and the plug portion 3 of the device is pushed into the socket so that the tongues 24 frictionally engage the wall of the socket and the pin 32 engages the live contact 33. The spring 37 has sufficient action to prevent normal contact of the contact ring 38 with the contact sleeve 23 during insertion of the plug. Since the ground side of the circuit has not been closed, there is no current flowing in the primary winding 15.

When the operator feels drowsy or that he is not alert, he merely places the palm of his hand over the electrode pins and pushes on the knob 2, so that the knob shifts enough to bring the contact ring 38 into contact with the contact sleeve 23. This action closes the primary circuit, since the vibratory contacts are normally closed. Flow of current through the primary winding 15 establishes a flux through the core 18 within the primary winding, which flux cuts the secondary winding 16 to induce flow of a high voltage secondary current to the electrode pins and across the portion of the hand which bridges the pins 63 and 56 or 56 and 55 by way of the conductor 57 to ground. With the flow of current, the core 18 becomes an electromagnet and attracts the armature 42 to separate the contacts 43 and 44 and interrupt the primary circuit. With stopping of the flow in the primary circuit, the core 18 loses its magnetism and the spring action in the armature again results in closing the primary circuit. The action is repeated as long as the hand pushes on the knob. Thus a series of invigorating currents are passed through the hand to stimulate the operator. Upon removal of the hand from the knob 2, the spring 37 returns the knob to its original position, so that the ground contact 38 moves away from the contact 23 to interrupt the current flow in the primary winding.

If desired, a condenser 65 may be connected across the contacts 43 and 44, as shown in dotted lines 66, in FIG. 3.

It is obvious that since the electromotive force of the secondary current is dependent upon the ratio of the turns of the secondary winding relatively to the turns of the primary winding, the device may be easily designed to produce the force that is desired simply by adding to or subtracting from the windings. Thus devices may be produced that give only a gentle stimulation or the effect may be made more pronounced and invigorating, as desired.

While I have illustrated the device as being portable so that it may be transferred from one vehicle to another, it is obvious that the device may be built in and made a part of the vehicle.

What I claim and desire to secure by Letters Patent is:
1. A device of the character described, including
   a socket having a contact adapted for connection with one terminal of an electric current source having the other terminal grounded,
   a knob adapted to be grasped by the hand of an operator,
   a current induction means in said knob including a core and primary and secondary windings on the core,
   a hub extending from the knob into the socket,
   a ground contact sleeve on the hub in connection with the ground of the electrical current source and having frictional engagement within the socket and containing the hub axially slidable therein,
   a stop collar,
   means securing the stop collar to the end of the hub for retaining the ground contact sleeve in assembly with the hub and knob,
   a contact carried with the hub in alignment with the ground contact sleeve but normally spaced axially therefrom when the hub is in one position in the ground contact sleeve,
   conducting means carried by the hub connecting the contact in said socket with one end of the primary winding,
   conducting means connecting the other end of the primary winding with the said contact fixed on the hub,
   a spring urging abutment of said stop collar and ground contact sleeve in one said position of the hub and yieldable for movement of the hub inwardly within the ground contact sleeve to a position for closing an electric circuit through the primary winding when said fixed contact on the hub engages the ground contact sleeve under an axial thrust of the hand on said knob,
   means in said last named conducting means for opening and closing circuit therethrough responsive to magnetic pull of the core for effecting a pulsating current in the secondary winding, and
   electrodes carried by said knob and in circuit with the secondary winding for producing a stimulating current in the hand of an operator thrusting on the knob.
2. In a device of the character described,
   a socket having a contact adapted for connection with one terminal of an electric current source,
   a knob adapted to be grasped by the hand of an operator,
   electrode means carried by said knob,
   means in the knob and connected with the electrode means for generating a stimulating current across the electrode means,
   a hub extending from the knob into the socket,
   a ground contact sleeve having frictional engagement within the socket and containing the hub slidable therein in an axial direction,
   a stop collar,
   means securing the stop collar to the hub for retaining the ground contact sleeve in assembly with the hub and knob, a contact carried with the hub in alignment with but normally spaced from the ground contact sleeve in one position of the hub in said ground contact sleeve, means connecting said fixed contact on the hub and said electric contact of the socket in circuit with said generating means, and a spring urging abutment of said stop collar with the ground contact sleeve in said one position of the hub and yieldable for inward movement of the hub within the ground contact sleeve for effecting engagement of the contact that is carried with the hub with the ground contact sleeve to close said circuit for energizing the generating means under inward thrust of the hub by the hand grasping the knob.

3. A device of the character described, including a socket having an electric contact to which an electric current is supplied, a knob including a body member and a cap mounted on the body member, current induction means in said body member and including a core and primary and secondary windings on the core, a hub extending from the body member into the socket, a ground contact sleeve on the hub having frictional engagement within the socket, contact means on the hub and connected with one lead of the primary winding, said hub having axial movement in the ground contact sleeve for engaging said contact on the hub with the sleeve by an axial thrust on the cap of the body member, means connected with the other lead of the primary winding and carried by the hub and insulated from the ground contact sleeve to engage the contact of the socket, a spring normally retaining the contact means on the hub from the contact sleeve and yieldable under an axial thrust on the cap member for movement of the hub within the ground contact sleeve to engage the contact on the hub with the ground contact sleeve for closing an electric circuit through the primary winding, contacts in the circuit of the primary winding, one of which is vibrated into and out of contact with the other by the magnetic pull of the core for making and breaking said circuit of the primary winding for effecting a pulsating current in the secondary winding, and electrodes carried by said cap and respectively connected with the secondary winding for producing a stimulating current in the hand of an operator pushing on the cap.

4. A device of the character described, including a socket having an electric contact to which an electric current is supplied, a body member having a recess opening from one end and a cap member mounted on the body member and providing a compartment at the other end of the body member, current induction means in said recess including a core and primary and secondary windings on the core, a hub extending from the body member into the socket, a ground contact sleeve on the hub having frictional engagement within the socket, means securing the hub to the body member for closing said recess, contact means on the hub and connected with one lead of the primary winding, said hub having axial movement in the ground contact sleeve for engaging said contact with the ground contact sleeve by an axial thrust on the cap member, means connected with the other lead of the primary winding and carried by the hub and insulated from the ground contact sleeve to engage the contact of the socket when the hub is inserted into the socket, a spring normally retaining the contact means on the hub from the contact sleeve and yieldable under said axial thrust on the cap member for movement of the hub within the ground contact sleeve to engage the contact on the hub with the ground contact sleeve for closing an electric circuit through the primary winding, contacts located in said compartment and in the circuit of the primary winding one of which is vibrated into and out of contact with the other by the magnetic pull of the core for making and breaking said circuit of the primary winding for effecting a pulsating current in the secondary winding, and electrodes carried by said cap member and respectively connected with the secondary winding for producing a stimulating current in the hand of an operator pushing on the cap member.

5. A device of the character described, including a socket having an electric contact to which an electric current is supplied, a body member having a recess opening from one end and a cap member mounted on the other end of the body member and providing a compartment in tandem with the recess of the body member, current induction means in said recess including a core and primary and secondary windings on the core said core having one end extending through to said compartment, a hub extending from the body member into the socket, a ground contact sleeve having frictional engagement within the socket and containing the hub slidable therein, a stop collar, an electrically conductive assembly securing the stop collar to the end of the hub for retaining the ground contact sleeve in assembly with the hub and having a contact with the electric contact of the socket, means securing the hub to the body member for closing said recess, a sleeve fixed to the hub and providing a contact in alignment with the ground contact sleeve, conducting means connecting the said contact sleeve with one end of the primary winding, conducting means connecting the other end of the primary winding with the electrically conductive assembly, a spring between the hub and ground contact sleeve normally retaining the contact sleeve from engagement with the ground contact sleeve and yieldable for movement of the hub within the ground contact sleeve to engage said sleeves for closing an electric circuit through the primary winding when an axial thrust is applied to the cap member, contacts in the compartment and connected into said conducting means which connects with the contact sleeve, one of which contacts is vibrated into and out of contact with the other by said end of the magnetic pull of the core for breaking said circuit of the primary winding for effecting a pulsating current in the secondary winding, and electrodes carried by said cap member and respectively connected with the secondary winding for producing a stimulating current in the hand of an operator pushing on the cap member.

References Cited

UNITED STATES PATENTS

| 807,464 | 12/1905 | Hoffmann | 128—406 |
|---|---|---|---|
| 1,881,878 | 10/1932 | Nidy. | |
| 3,049,090 | 8/1962 | Bergen | 340—279 X |

FOREIGN PATENTS 21,389   1910   Great Britain.

RICHARD A. GAUDET, *Primary Examiner.*

W. E. KAMM, *Assistant Examiner.*